No. 837,660. PATENTED DEC. 4, 1906.
V. D. BLANPAIN & A. JASPART.
UNIVERSAL MACHINE FOR WORKING MATERIALS.
APPLICATION FILED MAR. 7, 1904.
2 SHEETS—SHEET 1.
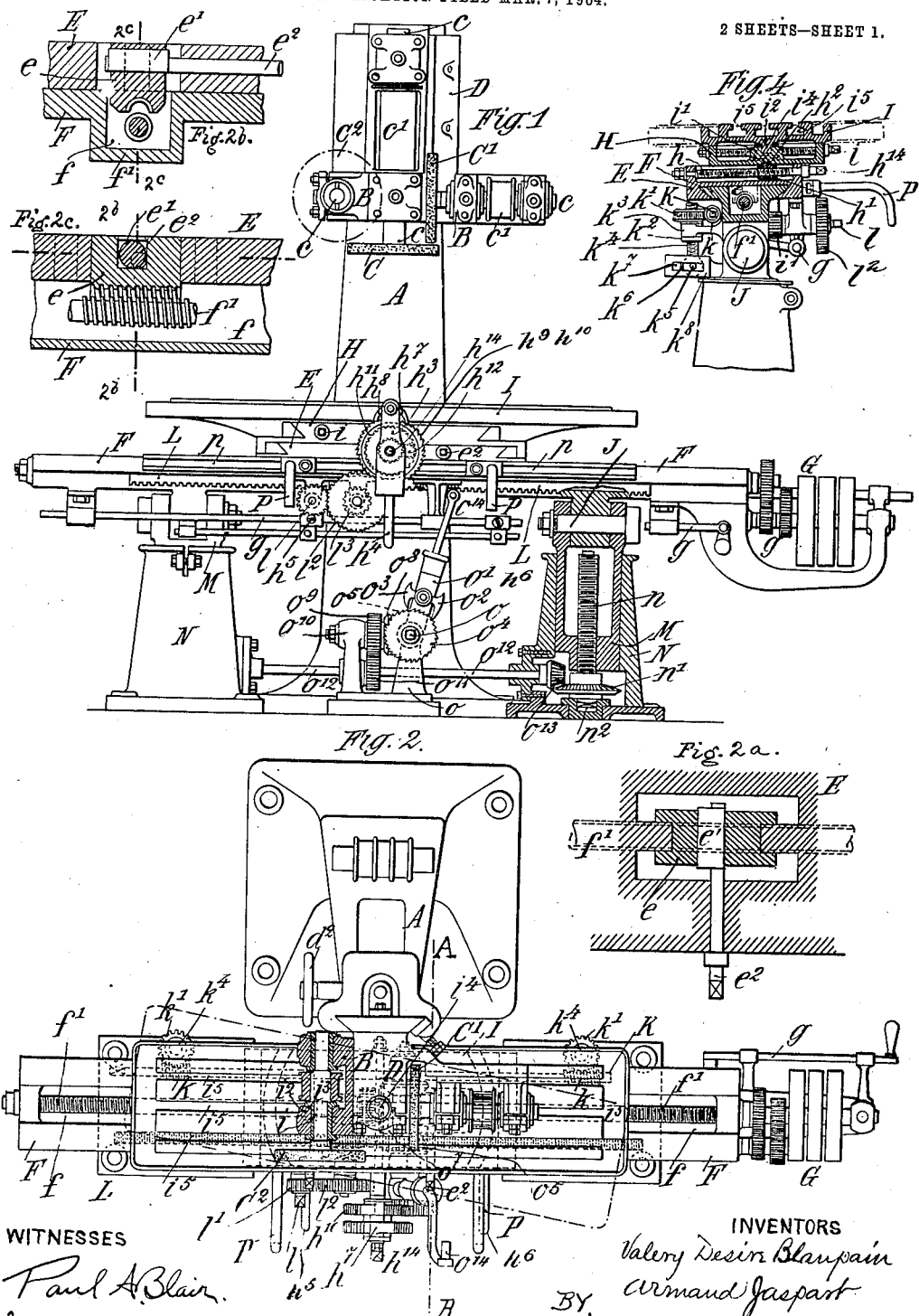
WITNESSES
Paul A. Blair
Walter Abbe
INVENTORS
Valery Desire Blanpain
Armand Jaspart
BY Howson and Howson
ATTORNEYS

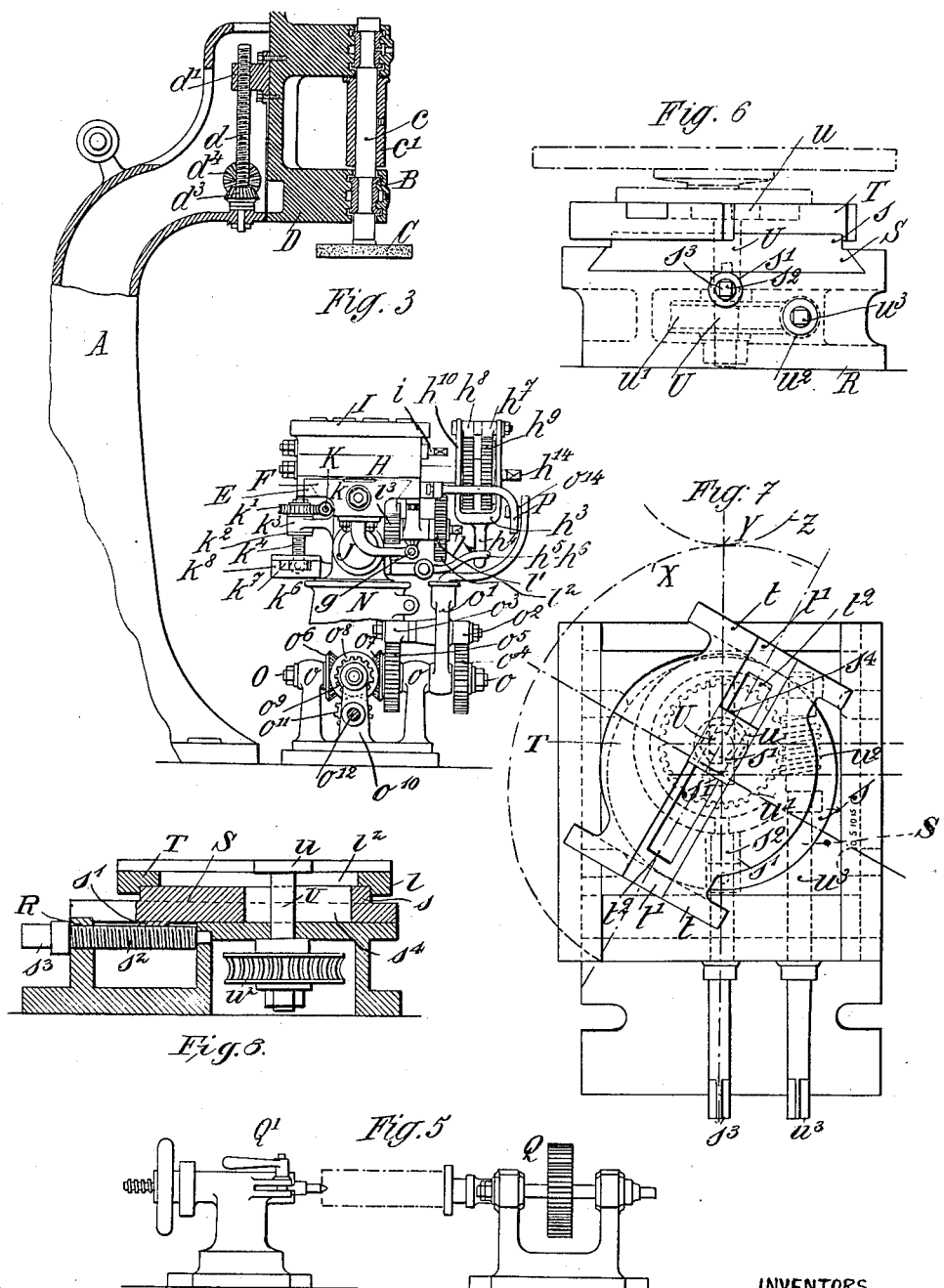

UNITED STATES PATENT OFFICE.

VALERY DÉSIRÉ BLANPAIN AND ARMAND JASPART, OF PARIS, FRANCE.

UNIVERSAL MACHINE FOR WORKING MATERIALS.

No. 837,660.     Specification of Letters Patent.     Patented Dec. 4, 1906.

Application filed March 7, 1904. Serial No. 196,871.

*To all whom it may concern:*

Be it known that we, VALERY DÉSIRÉ BLANPAIN, of 58 Rue Amelot, and ARMAND JASPART, of 63 Rue St. Sabin, Paris, France, citizens of the French Republic, have invented a certain new and useful Universal Machine for Working Materials, of which the following is a full, clear, and exact description.

This invention relates to a machine for molding, shaping, turning, polishing, drilling, sawing, and the like marble, granite, stone, metals, glass, and in general all materials capable of being worked.

The machine comprises three tool-holders, to each of which can be attached either a shaping or turning grinder, or a polishing-head, or a drill, or a saw, or any other suitable tool, and allows to be carried out on the blocks of material of any kind that are to be worked all operations which may be desired. The three tools are arranged one upon a vertical axis and the two others on two horizontal axes placed at right angles. They can work horizontally, longitudinally, and transversely.

The following movements can be imparted to the carriage of the machine on which is fixed the block to be worked:

First, an automatic longitudinal to-and-fro movement, this motion also being regulable by hand.

Second, a progressive motion of transverse displacement of the carriage.

Third, a progressive motion of vertical displacement of the carriage. These two last displacements can be controlled either automatically by the longitudinal to-and-fro motion of the carriage after each passage of this latter before the tool or manually by means of a lever.

Fourth, an angular motion in the vertical plane, controlled by hand.

Fifth, an angular motion in the horizontal plane, also controlled by hand. There may also be arranged on the carriage a horizontal lathe or an elliptical lathe or any other apparatus necessary for the work to be executed.

The description of this machine is given hereinafter with reference to the accompanying drawings, in which—

Figure 1 is a front elevation of the machine. Fig. 2 is a corresponding plan, partly in section. Fig. $2^a$ is a detail sectional plan of the hand mechanism for controlling the longitudinal movement of the table. Fig. $2^b$ is a detail sectional end elevation of the same, taken on the line A B of Fig. 2. Fig. $2^c$ is a detail sectional elevation of the same, taken on the line $2^c$ of Fig. $2^b$. Fig. 3 is an end elevation, partly in section. Fig. 4 is a cross-section, the carriage being displaced transversely and angularly in the vertical plane. Fig 5 is a front elevation of the horizontal lathe, which can be mounted on the carriage of the machine. Figs. 6 and 7 show in front elevation and in plan an elliptical lathe, which also can be mounted on the carriage. Fig. 8 is a detail sectional view.

A is a standard on which are arranged the tool-holders B, in which are secured the grinding-wheels C C' $C^2$. Each of these grinders is driven by means of a shaft $c$ and a pulley $c'$, controlled by motive power of any kind. The head D, carrying the tool-holders, receives a vertical movement by means of a screw $d$ and a nut $d'$, the screw $d$ being driven by a hand-wheel $d^2$ and two bevel-pinions $d^3$ and $d^4$.

The carriage which supports the pieces to be worked comprises three slides, of which one, E, Figs. 1, 2, 3, and 4, is longitudinally adjusted by dovetailing on a table F, in the recess $f$ of which there rotates a screw $f'$, having a driving mechanism G similar to that of ordinary lathes with back gear $g$. A movable half-nut $e$, secured to the slide E, can be engaged upon the screw $f'$, which then drives this slide longitudinally.

On the slide E, Fig. 4, is transversely adjusted by dovetailing a second slide H, which can be moved on the slide E by means of a screw $h$, mounted in the latter and on which is movable a nut $h'$, driving the slide H transversely by means of its gudgeon $h^2$. The screw $h$ is automatically driven by a fork $h^3$, mounted loosely at its upper extremity. At its lower part this fork is provided with an arm $h^4$, which at each longitudinal to-and-fro movement of the carriage alternately comes in contact with the fingers $h^5$ and $h^6$, the position of which is adjustable upon the carriage. The contact with these fingers causes the fork $h^3$ to oscillate alternately at the end of each stroke of the carriage in front of the working tool. These oscillations are transmitted to the screw $h$ by two pawls $h^7$ and $h^8$, mounted loosely on a pivot in the upper portion of the fork $h^3$. These pawls, which act in opposite directions, are respectively in gear with the ratchet-wheels $h^9$ and $h^{10}$, the first of which, $h^9$, is keyed to the end of the screw $h$, to which it transmits directly the action of the pawl $h^7$, while the ratchet-wheel $h^{10}$ is loose on the screw $h$, which it drives by means of its internal-toothed crown $h^{11}$, in gear with a pinion $h^{12}$, revolubly mounted on the slide E, itself in gear with another pinion $h^{13}$, keyed to the screw $h$, and which thus transmits to this latter the action of the pawl $h^8$ in the same direction as that of the pawl $h^7$. For working by hand a lever is fixed on the square $h^{14}$ at the end of the screw, care being taken to reverse the pawls $h^7$ and $h^8$, so that they are no longer in gear with the ratchets. In the same way there is mounted on the slide H, on a circular dovetailing, a third slide I, Figs. 2 and 4, which can be operated by means of a screw $i$, on which moves a nut $i'$, of which the gudgeon $i^2$, engaged in a slotted recess $i^3$, moves the slide I around its axis $i^4$, journaled on the slide H. The upper slide I has three T-slots $i^5$, which serve for fixing the work, the head and tail-stock of the horizontal lathe, the elliptical lathe, &c.

To the carriage is imparted a longitudinal reciprocating motion upon the table F in the ordinary manner. The screw $f'$ receives, through a driving mechanism G, the motive power from any source, the to-and-fro motion of the carriage being obtained by an ordinary back gearing $g$, Figs. 1 and 2. This longitudinal movement can also be obtained by hand when necessary, and it then suffices to release the nut $e$, Fig. 2$^b$, from this screw $f'$ by means of a cam $e'$, secured to a spindle $e^2$, on the end of which for this purpose a handle may be placed. The carriage thus freed from the driving mechanism can be displaced by means of a handle attached to the end of the shaft $l$ and by means of gear-wheels $l'$, $l^2$, and $l^3$, this last being in gear with a longitudinal rack L, secured to the table F, Figs. 1 and 2.

The table F and the whole of the slides E, H, and I, which form the carriage proper, being movable upon the said table, can be displaced around trunnions J J, Fig. 4. When it is desired to saw a block at any particular angle, the inclination of the whole apparatus is obtained by means of a shaft K, one of the ends of which has a square on which can be secured a handle. This shaft is journaled in supports forming part of the table F, carries two worms $k$, engaging two worm-wheels $k'$, respectively secured to a nut $k^2$, mounted in a fixed support $k^3$, secured to the table F and able to move upon a screw $k^4$, jointed at $k^5$ upon a die $k^6$, movable in the guide $k^7$ of a fixed support $k^8$, forming part of the fixed portion at the base of the trunnion J. The carriage E H I, table F, and all the controlling and reversing mechanism is supported by the trunnions J J and can receive an upward or a downward movement.

Each of the trunnions J J is attached to a piston M, seated in a column forming a cylinder N. The lower part of the piston M forms a nut in which is engaged a screw $n$, on which it rests. The two screws $n$ are simultaneously controlled in the following manner at each to-and-fro motion of the carriage: On a shaft O, journaled in two supports $o\ o$, is mounted loosely a lever $o'$, on which are arranged two pawls $o^2$ and $o^3$, respectively in gear with two ratchets $o^4\ o^5$. The ratchet $o^4$ is keyed on the shaft O, at the opposite end of which is also keyed a bevel-wheel $o^6$, while the ratchet $o^5$ is secured to a bevel-wheel $o^7$, mounted loosely on the shaft O. The two bevel-wheels are engaged by a third bevel-wheel $o^8$, secured to a toothed wheel $o^9$, having a bearing in a support $o^{10}$. The toothed wheel $o^9$ is itself in gear with another gear $o^{11}$, keyed on the shaft $o^{12}$, each end of which carries a bevel-wheel $o^{13}$, gearing with the bevel-wheels $n'$, keyed to the base of the screws $n$, supported by sockets $n^2$ in the lower portion of the columns N. The lever $o'$ carries at its lower end a transverse arm $o^{14}$, in the path of which are arranged two fingers P P, the position of which is adjustable in a guide $p$ of the carriage, which during the to-and-fro motion of the latter reverses alternately to right and left the lever $o'$, which in its turn acts sometimes on the ratchet $o^4$ and at other times on the ratchet $o^5$ and causes, both on the forward and return strokes, the whole mechanism carried by the pistons M M to rise automatically. Of course the rising and falling motions of this mechanism can be obtained by hand—for instance, by means of a handle to be fixed on the square at the end of the shaft O and by engaging or disengaging the pawls $o^2$ and $o^3$ from the ratchets $o^4$ and $o^5$.

In order to turn a column so as to form thereon flutings, &c., there may be arranged on the carriage a puppet Q and a tail-stock Q', Fig. 5, this lathe being driven in any suitable manner. For turning or molding oval-shaped pieces we set up on the carriage an elliptical lathe constructed in the following manner: On a pedestal R is adjusted by dovetailing a movable slide S, and this slide is provided at its upper part with a circular rabbet $s$. Its position on the pedestal can be varied by means of a screw $s'$, secured to the slide S and able to move along a screw $s^2$, supported on the pedestal R, and which can be operated by means of a handle engaged upon its end $s^3$. A pointer or index attached to this slide moves in front of a graduated scale on the pedestal. On the circular portion $s$ of the slide S is arranged another slide T, surrounding the circular portion $s$ on two sides $t\ t$. This slide is furnished with a groove $t'$, formed from one of the sides $t$ to the other, and a slot $t^2$, formed at the bottom of the slot $t'$, crosses the slide from one side to the other. The slide S also bears a slot $s^4$, crossing it from one side to the other. An axis U, suitably guided in the pedestal R, passes through the slides S and T and is ended by a rectangular head $u$, adjusted to slide in the slot $t'$ of the slide T. Toward the base of the axis U is fixed a worm-wheel $u'$, in gear with a worm $u^2$, keyed to an axle $u^3$, at the end of which may be attached a handle.

When the axis of the circular part of the slide S is coincident with the axis U, the slide T revolves concentrically with this axis and the parts which support this slide are revoluble in a circle. When the axis of the slide S is removed from that of axis U, the slide T, driven in a circle by the head $u$ being constrained by its edges $t$ $t$ to follow the circular rabbet $s$ $s$ of the slide S eccentric relatively to that of the axis U, turns in an oval manner, following the circular rabbet $s$, the slide T being displaced and held by the head $u$ of the axle U. This latter is impressed with a circular motion, regulated by hand by means of a handle through the axis $u^3$ of the worm $u^2$ and the worm-wheel $u'$. For turning or shaping an oval piece of work it is sufficient to displace the axis of the slide S with regard to the driving-axle U by an amount equal to the difference between half the major axis and half the minor axis of the ellipse X, this distance being read on the graduated scale marked on the pedestal R and indicated by the pointer carried by the slide S. This distance being fixed, the point of contact Y of this ellipse with the grinding-tool Z remains constant.

It will be understood from the above description that blocks placed on the carriage can easily be displaced longitudinally or transversely or be displaced angularly in the horizontal and vertical planes and, lastly, be raised and lowered—that is to say, they can be easily displaced in all directions. This machine thus allows all kinds of operations to be carried out.

We claim as our invention—

1. In a machine of the character described, the combination of a support A provided with several tool-carriers B mounted at right angles one to the other, a table F on which moves the carriage I, H, E comprising a plate I on which is secured the material to be operated on, a slide H under the said plate to move it in a circular direction in a horizontal plane around a central vertical axis $i^4$, a second slide E under the first slide H to move the said plate I transversely, the said table being mounted on a horizontal axis to be moved in a vertical plane, and standards M supporting said horizontal axis for adjusting the height of the table.

2. In a machine of the character described, the combination of a table F, a plate I, to carry the material to be operated on, a means $i, i', i^2, i^3$ under the said plate to move it by hand in a horizontal plane around a central axis $i^4$, a means $h$ $h^{14}$ to move automatically and progressively the said plate longitudinally in a continuous and intermittent way in one direction and in the other, a means $k$ $k^8$ to move the table by hand around a horizontal axis, and a means $o$ $o^{13}$, $n, n'$ to raise and lower the said table automatically and progressively and a support A carrying several tool-holders B, a means $d$ $d^4$ to cause the said tool-holders to rise or descend by hand, and a separate control for each of the tools.

In testimony whereof we have signed our names to this specification in the presence of two subscribing witnesses.

VALERY DÉSIRÉ BLANPAIN.
ARMAND JASPART.

Witnesses:
 GUSTAVE DUMONT,
 GEORGE E. LIGHT.